United States Patent Office 3,263,778
Patented August 2, 1966

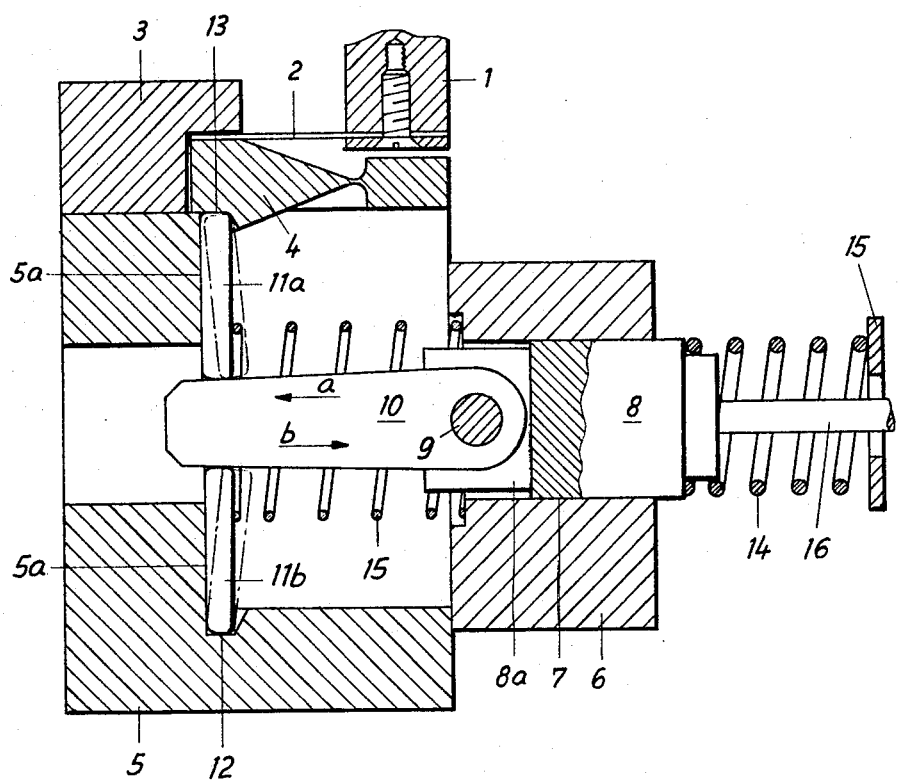

3,263,778
DEVICE FOR RELEASABLY CLAMPING AN ADJUSTABLE SLIDE TO A SUPPORT MEMBER
Hans Ernst Pfeiffer, Schlieren, Zurich, Switzerland, assignor to Rolma A.G., Zurich, Switzerland
Filed Aug. 28, 1964, Ser. No. 392,959
Claims priority, application Switzerland, Aug. 30, 1963, 10,793/63
7 Claims. (Cl. 188—67)

The invention relates to a device for clamping an adjustable slide or the like, more particularly of machine tools, by means of an axially moving wedge.

It is known for power-operated clamping devices for slides or the like to operate by means of wedges, with a view to providing maximum clamping with minimum power. Unfortunately, very slender wedges, although providing a very considerable force amplification, are very likely to jam and so cannot be used. It is also known to use toggles, since the same can provide strong clamping for relatively little power input. Unfortunately, toggles require frequent readjustment because of wear.

It is an object of the invention to combine the advantages of both systems but to obviate their disadvantages. In the device according to the invention, the adjustable slide or the like has clampable member which engages between a stationary clamping element and a resilient clamping element; at least one toggle lever is provided which bears against the wedge and the resilient clamping element; and when the wedge moves axially in the clamping direction, the toggle lever presses the resilient clamping element and the clampable member against the stationary clamping element. In a preferred embodiment, the wedge is pivotally mounted on an axially moving holder; two toggle levers are provided which bear against opposite surfaces of the wedge, one toggle lever bears against the resilient clamping element, the other toggle lever bears against a stationary abutment, and a spring tends to press the toggle levers against fixed abutments.

An embodiment of the subject matter of the invention is illustrated in the drawing which is a section through a clamping device for an adjustable slide or the like.

It is assumed that an adjustable slide or the like is movable perpendicularly to the plane of the drawing. Only that part 1 of the slide is shown to which a steel band 2 is secured, the band 2 engaging between a stationary clamping element 3 and a clamping element 4 having a resilient connection with the support 5. The elements 3, 4 form parts of a support member 5 having secured to it a guide 6 formed with a passage 7 in which a bifurcated holder 8 can move axially. A wedge 10 is pivotally mounted on a spindle 9 in the forked part 8a of the holder 8 and engages between two substantially flat toggle levers 11a, 11b which are mounted in the support 5 within an opening therein. The wedge member 10 is provided with opposed wedge surfaces converging in a direction away from the spindle 9 so that the inner ends of the toggle levers 11a and 11b will be engaged by said wedge 10 and will be held in place within said support member 5 (see drawing). Movement of said wedge member in a direction toward said toggle levers causes said wedge member to slide therebetween and exert a radial force on said yieldingly mounted gripping member 4.

That end of the lever 11b which is remote from the wedge 10 is pivotally mounted in a recess 12 in the opening of the support member 5, and that end of the lever 11a which is remote from the wedge 10 is pivotally mounted in a recess 13 in the resiliently mounted clamping element 4. A spring 15 tends to press the two levers 11a, 11b against abutment surfaces 5a of the member 5. A second spring 14 which is stronger than the spring 15 is disposed between the holder 8 and an abutment 15. A pin or stud or the like 16 experiences traction, for instance, from an electromagnet (not shown) when the winding thereof is energised.

The device operates as follows:

When the device is in the normal position, the spring 14 forces the holder 8 in the direction indicated by an arrow $a$ so that the wedge 10 is pressed between the toggle levers 11a, 11b. The same move outwards and the lever 11a presses the resilient element 4 against the band 2 to clamp the slide 1.

When it is required to move the slide 1, the pin or the like 16 is pulled, against the force of the spring 14, in the direction indicated by an arrow $b$, for instance, by means of an electromagnet whose winding is energised simultaneously as the motor for adjsuting the slide 1 is energised. The holder 8 therefore pulls the wedge 10 in the direction indicated by the arrow $b$ and the toggle levers 11a, 11b tend to move into the position shown in chain-dotted lines; however, the spring 15 returns them to their original position but pressure ceases to be applied to the resilient element 4 so that the band 2 ceases to be clamped.

Slight wear of the contact surfaces between the wedge 10 and the toggle levers 11a, 11b is unimportant and is compensated for automatically since all that happens is that the wedge 10 has to move further in the direction $a$ before clamping occurs.

What I claim is:

1. In a device for releasably clamping an adjustable slide to a support member, an axially slidable holder mounted in said support member, a wedge axially movable in said support member pivotally connected to said holder, a stationary clamping element on said support having a gripping surface, a resilient clamping element on said support member movable toward and away from said surface, at least one toggle lever in said support mounted between said wedge and said resilient clamping element with its ends in abutting relation therewith, and a clampable member secured to said adjustable slide and guided between said stationary and said resilient clamping element, said clampable member being adapted to be frictionally held between said stationary clamping element and said resilient clamping element when said holder is moved axially in said support member.

2. In a device for releasably clamping an adjustable slide to a support member, an axially slidable holder mounted in said support member, a wedge axially movable in said support member pivotally connected to said holder, a stationary clamping element on said support having a gripping surface, a resilient clamping element on said support member movable toward and away from said surface, a pair of opposed toggle levers in said support mounted between said wedge on the one hand and said resilient clamping element and an opposed part of said support member respectively on the other hand, and a clampable member secured to the said slide and guided between said stationary and said resilient clamping element, said clampable member being adapted to be frictionally held between said stationary clamping element and said resilient clamping element when said holder is moved axially in said support member.

3. In a device for releasably clamping an adjustable slide to a support member having an abutment, an axially slidable holder mounted in said support member, a wedge axially movable in said support member pivotally connected to said holder, a stationary clamping element on said support having a gripping surface, a resilient clamping element on said support member movable toward and away from said surface, a pair of opposed toggle levers in said support mounted between said wedge on the one hand and said resilient clamping element and an opposed part of said support member respectively on the other hand, one of said toggle levers being mounted with its ends in engagement with said wedge and resilient clamping element and the other toggle lever being mounted with one end in engagement with said wedge and its other end in engagement with said abutment and a steel band secured to the said slide and guided between said stationary and said resilient clamping element.

4. In a device for releasably clamping an adjustable slide to a support member, an axially slidable holder in said support member, a wedge axially movable in said support member pivotally connected to said holder, a stationary clamping element on said support having a gripping surface, a resilient clamping element on said support member in opposed relation to said stationary clamping element, a pair of opposed toggle levers arranged one between said wedge and said resilient clamping element and the other between an opposed part of said support member and said wedge, and a clampable member secured to the said slide and guided between said stationary and said resilient clamping element, said axially slidable holder being mounted for movement in a direction at right angles to said toggle levers to exert a force against said resilient clamping member in the direction of said stationary clamping element.

5. In a device for releasably clamping an adjustable slide to a support member, a support member having a central opening, a slidable holder movably mounted in said opening, a wedge axially movable in said support member a stationary clamping element on said support having a gripping surface, a resilient clamping element on said support member opposed to said surface, a pair of opposed toggle levers arranged in abutting relation between said wedge and said resilient clamping element and an opposed part of said support member and a clampable member secured to the said slide and guided between said stationary and said resilient clamping element, said support being provided with abutment surfaces around said opening, and a spring acting on said toggle levers and urging the latter against said abutment surfaces.

6. In a clamping device for holding the slide for machine tools and the like in a predetermined position of adjustment, comprising a support member mounted adjacent said slide having a central opening, a fixed and stationary clamping member adjacent said slide and offset therefrom, a resiliently mounted gripping member in opposed relation to said stationary clamping member, said slide having a longitudinal projection arranged between said stationary clamping member and said resiliently mounted gripping member, a holder reciprocably mounted in said opening, a wedge member pivoted to said holder, two toggle levers arranged one on each side of said wedge member, one of said levers being in abutting relation with the resiliently mounted gripping member and the other arranged in abutting relation with a surface on said support member, and yielding spring means for yieldingly urging said toggle levers into engagement with said support member.

7. In a clamping device for holding the slide of a machine tool or the like in a pre-set position, in which said slide is provided with a longitudinal surface, a support member having an opening adapted to be mounted adjacent said slide in fixed relation therewith, fixed and movable gripping members on said supporting member having surfaces for frictionally engaging opposite sides of said longitudinal surface, an actuating member movably mounted in said opening, a wedge member carried by said actuating member and movable therewith, a pair of toggle lever plates on opposite sides of said wedge member, one of said lever plates having its outer end in engagement with the movable gripping member and the other toggle plate having its outer end in engagement with a wall portion in said opening, the inner ends of said toggle plates being in engagement with said wedge whereby movement of said wedge in one direction will exert a force on said movable gripping member and urge the same into gripping engagement with said longitudinal surface, and a spring for urging said toggle lever plates against abutment walls formed by a reduced diameter of said opening.

References Cited by the Examiner
UNITED STATES PATENTS

| 831,055 | 9/1906 | Gilmore | 188—43 |
| 999,393 | 8/1911 | Moore. | |
| 2,741,336 | 4/1956 | Fortini | 188—166 X |

MILTON BUCHLER, *Primary Examiner.*

G. E. A. HALVOSA, *Assistant Examiner.*